United States Patent
Liu et al.

(10) Patent No.: US 12,204,081 B1
(45) Date of Patent: Jan. 21, 2025

(54) DARK-FIELD CONFOCAL MICROSCOPY MEASUREMENT APPARATUS AND METHOD BASED ON TIME-VARYING FRACTIONAL-ORDER VORTEX DEMODULATION

(71) Applicant: Harbin Institute of Technology, Harbin (CN)

(72) Inventors: Jian Liu, Harbin (CN); Chenguang Liu, Harbin (CN); Zijie Hua, Harbin (CN); Xiaoyu You, Harbin (CN)

(73) Assignee: Harbin Institute of Technology, Harbin (CN)

(*) Notice: Subject to any disclaimer, the term of this patent is extended or adjusted under 35 U.S.C. 154(b) by 0 days.

(21) Appl. No.: 18/812,680

(22) Filed: Aug. 22, 2024

(30) Foreign Application Priority Data

Jul. 26, 2024 (CN) .......................... 202411010373.7

(51) Int. Cl.
*G02B 21/00* (2006.01)
*G02B 21/26* (2006.01)

(52) U.S. Cl.
CPC ..... *G02B 21/0032* (2013.01); *G02B 21/0048* (2013.01); *G02B 21/006* (2013.01); *G02B 21/26* (2013.01)

(58) Field of Classification Search
CPC ............ G02B 21/0032; G02B 21/0048; G02B 21/006; G02B 21/26; G02B 21/0036; G02B 21/0068; G02B 21/18
See application file for complete search history.

(56) References Cited

U.S. PATENT DOCUMENTS

| | | | | |
|---|---|---|---|---|
| 7,755,832 B2* | 7/2010 | MacAulay | ............. | G02B 21/36 359/388 |
| 9,041,938 B2* | 5/2015 | Zheng | ................... | G02B 21/14 356/521 |
| 10,067,072 B2* | 9/2018 | Gaind | ................ | G01N 21/9501 |
| 2004/0201855 A1* | 10/2004 | Hill | .................... | G02B 21/0056 356/511 |

FOREIGN PATENT DOCUMENTS

CN 113960010 A * 1/2022 ............. G01N 21/49

* cited by examiner

*Primary Examiner* — Mustak Choudhury
(74) *Attorney, Agent, or Firm* — M&B IP Analysts, LLC

(57) ABSTRACT

This application relates to the technical field of confocal microscopy measurement and provides a dark-field confocal microscopy measurement apparatus and method based on time-varying fractional-order vortex demodulation. The apparatus includes a time-varying modulated illumination module, an optical scanning module, a signal collection and demodulation module, a function generator, and a sample platform. The function generator is separately connected with. The time-varying modulated illumination module is configured to emit fractional-order vortex light to the optical scanning module. The optical scanning module is configured to transmit the fractional-order vortex light to the to-be-measured sample on the sample platform and transmit a reflected light signal to the signal collection and demodulation module. The signal collection and demodulation module is configured to collect the reflected light signal, and perform dark-field confocal detection on the reflected light signal based on a reference signal, to obtain measurement information of the to-be-measured sample.

10 Claims, 3 Drawing Sheets

DARK-FIELD CONFOCAL MICROSCOPY MEASUREMENT APPARATUS AND METHOD BASED ON TIME-VARYING FRACTIONAL-ORDER VORTEX DEMODULATION

CROSS REFERENCE TO RELATED APPLICATION

This patent application claims the benefit and priority of Chinese Patent Application No. 202411010373.7, filed with the China National Intellectual Property Administration on Jul. 26, 2024, the disclosure of which is incorporated by reference herein in its entirety as part of the present application.

TECHNICAL FIELD

This application relates to the technical field of confocal microscopy measurement, and in particular to a dark-field confocal microscopy measurement apparatus and method based on time-varying fractional-order vortex demodulation.

BACKGROUND

Interlayer defects (such as holes and layer faults) in three-dimensional (3D) integrated circuits often degrade the electrical performance and lifespan. Therefore, detecting these interlayer defects is crucial for ensuring high product yield in semiconductor 3D integrated circuits. The confocal microscopy measurement technology is suitable for non-destructive defect detection in 3D integrated circuits due to its 3D sectioning capability. However, the strong surface reflection information of 3D integrated circuits may overwhelm the weak scattering information of interlayer defects, leading to insufficient sensitivity in defect detection, especially for detecting nano-scale defects. In a dark-field confocal microscopy measurement apparatus, the sensitivity of the measurement system reflects the ability to detect minor signals. Higher sensitivity enables detection of minor signal changes in the sample, thereby achieving a higher defect detection rate. In high-sensitive defect detection, factors such as the quality of the light source, ambient noise, and detector noise significantly affect the measurement accuracy of the dark-field confocal microscopy measurement apparatus, resulting low sensitivity and inaccuracy measurement of the dark-field confocal microscopy measurement apparatus. Therefore, it is an urgent problem to be solved by those skilled in the art to stably improve the sensitivity of the dark-field confocal microscopy measurement apparatus.

SUMMARY

The purpose of this application is to provide a dark-field confocal microscopy measurement apparatus and method based on time-varying fractional-order vortex demodulation, to enhance the sensitivity of the dark-field confocal microscopy measurement apparatus and improve measurement accuracy.

To achieve the above objectives, this application provides the following technical solutions.

According to a first aspect, this application provides a dark-field confocal microscopy measurement apparatus based on time-varying fractional-order vortex demodulation, including a time-varying modulated illumination module, an optical scanning module, a signal collection and demodulation module, a function generator, and a sample platform. The function generator is separately connected with the time-varying modulated illumination module and the signal collection and demodulation module.

The function generator is configured to provide reference signals for the time-varying modulated illumination module and the signal collection and demodulation module separately.

The sample platform is configured to hold a to-be-measured sample.

The time-varying modulated illumination module is configured to emit fractional-order vortex light to the optical scanning module.

The optical scanning module is configured to: transmit the fractional-order vortex light to the to-be-measured sample on the sample platform, and after the fractional-order vortex light is reflected by the to-be-measured sample to generate a reflected light signal, transmit the reflected light signal to the signal collection and demodulation module.

The signal collection and demodulation module is configured to: collect the reflected light signal, and perform dark-field confocal detection on the reflected light signal based on the reference signal, to obtain measurement information of the to-be-measured sample, where the measurement information is a measurement result obtained through dark-field confocal detection and indicating whether the to-be-measured sample has defects or not.

Optionally, the time-varying modulated illumination module includes a laser, a half-wave plate, a polarizer, a first non-polarizing beam splitter, and a spatial light modulator (SLM) that are sequentially arranged, and the SLM is connected with the function generator.

The laser emits incident light, the incident light sequentially passes through the half-wave plate, the polarizer, and the first non-polarizing beam splitter and then reaches the SLM, the SLM modulates the incident light into the fractional-order vortex light based on the reference signal and transmits the fractional-order vortex light to the first non-polarizing beam splitter, and the first non-polarizing beam splitter transmits the fractional-order vortex light to the optical scanning module.

Optionally, the optical scanning module includes a second non-polarizing beam splitter, a galvanometer, a scanning lens, a tube lens, and an objective lens that are arranged in sequence.

The second non-polarizing beam splitter is arranged opposite to the first non-polarizing beam splitter, and the objective lens is arranged opposite to the sample platform.

The second non-polarizing beam splitter receives the fractional-order vortex light emitted from the first non-polarizing beam splitter, and the fractional-order vortex light sequentially passes through the galvanometer, the scanning lens, the tube lens, and the objective lens, and then irradiates the to-be-measured sample on the sample platform.

The objective lens receives the reflected light signal reflected by the to-be-measured sample, and sequentially transmits the reflected light signal to the tube lens, the scanning lens, and the galvanometer before reaching the second non-polarizing beam splitter, and the second non-polarizing beam splitter transmits the reflected light signal to the signal collection and demodulation module.

Optionally, the signal collection and demodulation module includes a diaphragm, a focusing lens, a pinhole, a photomultiplier, and a lock-in amplifier that are arranged in sequence.

The focusing lens is arranged opposite to the second non-polarizing beam splitter, and the diaphragm is arranged between the focusing lens and the second non-polarizing beam splitter; the lock-in amplifier is connected with the function generator.

The diaphragm receives the reflected light signal transmitted by the second non-polarizing beam splitter, filters the reflected light signal, and retains a central scattered light signal, the central scattered light signal is focused to the pinhole by the focusing lens, the photomultiplier converts the central scattered light signal into an electric signal, and transmits the electric signal to the lock-in amplifier, and the lock-in amplifier demodulates the electric signal based on the reference signal, to obtain the measurement information of the to-be-measured sample.

Optionally, the sample platform is a Z-axis translation stage.

According to a second aspect, this application provides a dark-field confocal microscopy measurement method based on time-varying fractional-order vortex demodulation. The method is applied to the dark-field confocal microscopy measurement apparatus based on time-varying fractional-order vortex demodulation according to the first aspect, and includes the followings steps:

A time-varying modulated illumination module emits fractional-order vortex light to an optical scanning module.

The optical scanning module transmits the fractional-order vortex light to a to-be-measured sample on a sample platform, and after the fractional-order vortex light is reflected by the to-be-measured sample to generate a reflected light signal, transmits the reflected light signal to a signal collection and demodulation module.

The signal collection and demodulation module collects the reflected light signal, and performs dark-field confocal detection on the reflected light signal based on a reference signal, to obtain measurement information of the to-be-measured sample, where the measurement information is a measurement result obtained through dark-field confocal detection and indicating whether the to-be-measured sample has defects or not.

Optionally, the time-varying modulated illumination module comprises a laser, a half-wave plate, a polarizer, a first non-polarizing beam splitter, and a spatial light modulator (SLM) that are sequentially arranged; and said a time-varying modulated illumination module emits fractional-order vortex light to an optical scanning module specifically includes the following steps:

The laser emits incident light, where the incident light sequentially passes through the half-wave plate, the polarizer, and the first non-polarizing beam splitter and then reaches the SLM.

The SLM modulates the incident light into the fractional-order vortex light based on a reference signal and transmits the fractional-order vortex light to the first non-polarizing beam splitter.

The first non-polarizing beam splitter transmits the fractional-order vortex light to the optical scanning module.

Optionally, the optical scanning module comprises a second non-polarizing beam splitter, a galvanometer, a scanning lens, a tube lens, and an objective lens that are arranged in sequence; and said the optical scanning module transmits the fractional-order vortex light to a to-be-measured sample on a sample platform, and after the fractional-order vortex light is reflected by the to-be-measured sample to generate a reflected light signal, transmits the reflected light signal to a signal collection and demodulation module specifically includes the following steps:

The second non-polarizing beam splitter receives the fractional-order vortex light emitted from the first non-polarizing beam splitter, and sequentially transmits the fractional-order vortex light to the galvanometer, the scanning lens, the tube lens, and the objective lens, to irradiate the to-be-measured sample on the sample platform.

The objective lens receives the reflected light signal reflected by the to-be-measured sample, and sequentially transmits the reflected light signal to the tube lens, the scanning lens, and the galvanometer before reaching the second non-polarizing beam splitter.

The second non-polarizing beam splitter transmits the reflected light signal to the signal collection and demodulation module.

Optionally, the signal collection and demodulation module comprises a diaphragm, a focusing lens, a pinhole, a photomultiplier, and a lock-in amplifier that are arranged in sequence; and said the signal collection and demodulation module collects the reflected light signal, and performs dark-field confocal detection on the reflected light signal based on a reference signal, to obtain measurement information of the to-be-measured sample specifically includes the following steps:

The diaphragm receives the reflected light signal transmitted by the second non-polarizing beam splitter, and filters the reflected light signal to obtain a central scattered light signal.

The focusing lens focuses the central scattered light signal to the pinhole, to transmit the central scattered light signal to the photomultiplier through the pinhole.

The photomultiplier converts the central scattered light signal into an electric signal, and transmits the electric signal to the lock-in amplifier.

The lock-in amplifier demodulates the electric signal based on the reference signal, to obtain the measurement information of the to-be-measured sample.

Optionally, the sample platform is a Z-axis translation stage.

According to specific embodiments provided in this application, this application discloses the following technical effects:

This application provides a dark-field confocal microscopy measurement apparatus and method based on time-varying fractional-order vortex demodulation. A time-varying modulated illumination module emits fractional-order vortex light to an optical scanning module. The optical scanning module transmits the fractional-order vortex light to a to-be-measured sample on a sample platform, and then transmits a reflected light signal from the to-be-measured sample to a signal collection and demodulation module. The signal collection and demodulation module collects and performs dark-field confocal detection on the reflected light signal. In this way, measurement information related to dark-field confocal detection of the to-be-measured sample can be obtained at the nano-scale level. By highlighting the scattering information with time-varying fractional-order vortex as the illumination light, the signal intensity of micro defects can be enhanced, thereby improving the sensitivity and accuracy of defect detection of the apparatus.

BRIEF DESCRIPTION OF THE DRAWINGS

To describe the technical solutions in the examples of this application or in the prior art more clearly, the following briefly describes the accompanying drawings required for the examples. Apparently, the accompanying drawings in the following description show merely some examples of this application, and a person of ordinary skill in the art may still derive other accompanying drawings from these accompanying drawings without creative efforts.

Figure 1:
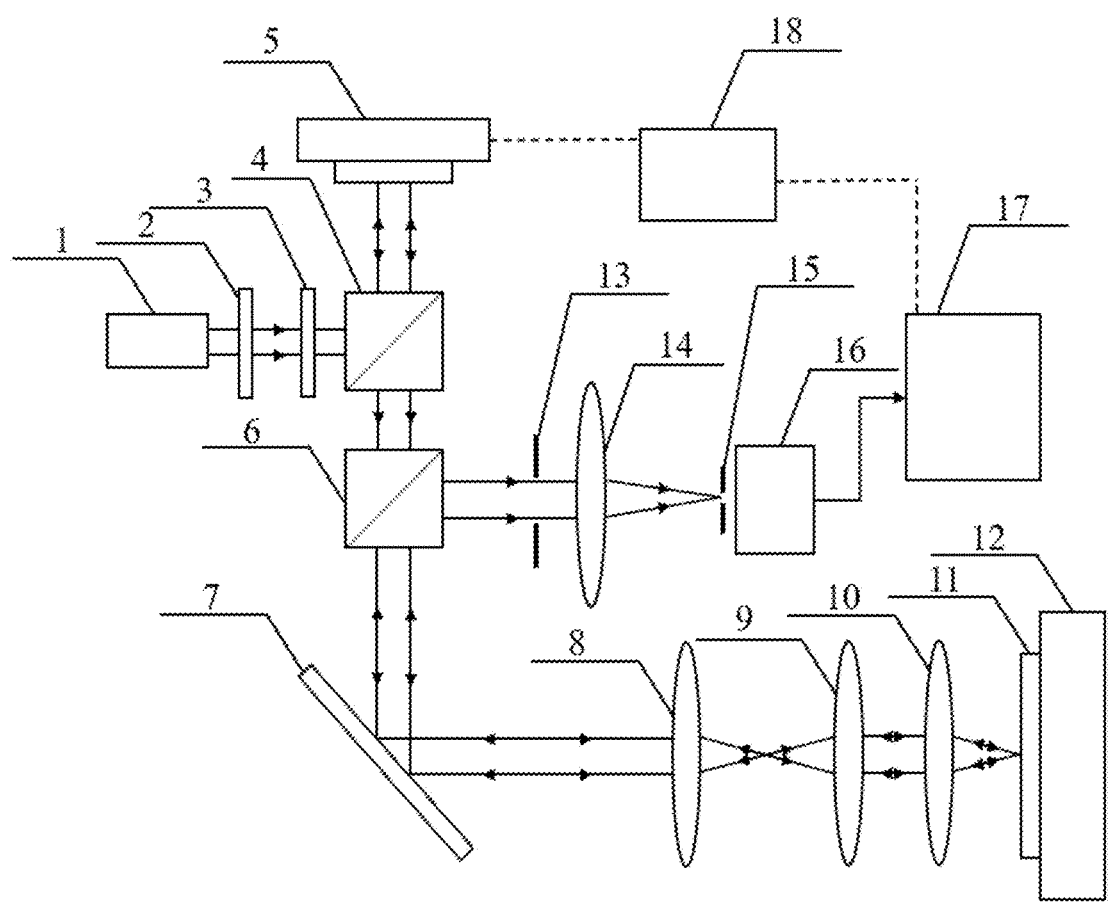
FIG. 1 is a schematic structural diagram of a dark-field confocal microscopy measurement apparatus based on time-varying fractional-order vortex demodulation according to an embodiment of this application.

REFERENCE NUMERALS 1-laser; 2-half-wave plate; 3-polarizer; 4-first non-polarizing beam splitter; 5-SLM; 6-second non-polarizing beam splitter; 7-galvanometer; 8-scanning lens; 9-tube lens; 10-objective lens; 11-to-be-measured sample; 12-Z-axis translation stage; 13-diaphragm; 14-focusing lens; 15-pinhole; 16-photomultiplier; 17-lock-in amplifier; and 18-function generator.

DETAILED DESCRIPTION OF THE EMBODIMENTS

The technical solutions in embodiments of the present application are described below clearly and completely with reference to the drawings in the embodiments of the present application. Apparently, the described embodiments are merely part rather than all of the embodiments of the present application. All other embodiments obtained by those of ordinary skill in the art based on the embodiments of the present application without creative efforts should fall within the protection scope of the present application.

To make the above objectives, features, and advantages of the present disclosure more obvious and easy to understand, the present disclosure will be further described in detail with reference to the accompanying drawings and specific implementations.

In an exemplary embodiment, as shown in FIG. 1, this application provides a dark-field confocal microscopy measurement apparatus based on time-varying fractional-order vortex demodulation, including a time-varying modulated illumination module, an optical scanning module, a signal collection and demodulation module, a function generator 18, and a sample platform. The function generator 18 is separately connected with the time-varying modulated illumination module and the signal collection and demodulation module.

The function generator 18 is configured to provide reference signals for the time-varying modulated illumination module and the signal collection and demodulation module separately.

The sample platform is configured to hold a to-be-measured sample 11.

The time-varying modulated illumination module is configured to emit fractional-order vortex light to the optical scanning module.

The optical scanning module is configured to: transmit the fractional-order vortex light to the to-be-measured sample 11 on the sample platform, and after the fractional-order vortex light is reflected by the to-be-measured sample 11 to generate a reflected light signal, transmit the reflected light signal to the signal collection and demodulation module.

The signal collection and demodulation module is configured to: collect the reflected light signal, and perform dark-field confocal detection on the reflected light signal based on the reference signal, to obtain measurement information of the to-be-measured sample 11. The measurement information is a measurement result obtained through dark-field confocal detection and indicating whether the to-be-measured sample 11 has defects or not. In other words, the dark-field confocal microscopy measurement apparatus is applied to nano-scale defect detection of semiconductor chips, and the function is to detect whether there are nano-scale defects at the measurement points of the semiconductor chips.

In this embodiment, the time-varying modulated illumination module includes a laser 1, a half-wave plate 2, a polarizer 3, a first non-polarizing beam splitter 4, and an SLM 5 arranged a light propagation direction. The SLM 5 is connected with the function generator 18, and the function generator 18 provides a reference signal for spatial light modulation. The laser 1 refers to a light source that can emit laser light, and the laser light emitted by the laser 1 is taken as the initial incident light in this embodiment. The half-wave plate 2 refers to a birefringent crystal with a specific thickness. When normal incident light passes through a crystal, if a phase difference between ordinary light and extraordinary light equals $\pi$ or an odd multiple of $\pi$, such a crystal is called a half-wave plate 2 (or called $\lambda/2$ plate). The polarizer 3 refers to polaroid glass which possesses excellent optical properties such as high light transmittance. The non-polarizing beam splitter functions to split light, primarily configured to split a single beam into two or more beams. Under active control, the SLM is capable of modulating specific parameters of the optical field by means of liquid crystal molecules, for example, modulating the amplitude of the optical field, modulating the phase via the refractive index, modulating the polarization state by rotating the polarization plane, or achieving the conversion from incoherent to coherent light. Thus, specific information is inscribed into the light wave to realize light wave modulation. The SLM can easily load information into one-dimensional or two-dimensional (2D) light fields and utilize the wide bandwidth and multi-channel parallel processing of light to process the loaded information quickly. The SLM is the core device of real-time optical information processing, optical interconnection, optical computing and other systems.

In this embodiment, the laser 1 emits incident light, the incident light sequentially passes through the half-wave plate 2, the polarizer 3, and the first non-polarizing beam splitter 4 and then reaches the SLM 5. The SLM 5 modulates the incident light into the fractional-order vortex light based on the reference signal and returns the fractional-order vortex light to the first non-polarizing beam splitter 4. The first non-polarizing beam splitter 4 then transmits the fractional-order vortex light to the optical scanning module.

In this embodiment, the optical scanning module includes a second non-polarizing beam splitter 6, a galvanometer 7, a scanning lens 8, a tube lens 9, and an objective lens 10 arranged sequentially in the light propagation direction. The second non-polarizing beam splitter 6 is arranged opposite to the first non-polarizing beam splitter 4, and the objective lens 10 is arranged opposite to the sample platform. The second non-polarizing beam splitter 6 receives the fractional-order vortex light emitted from the first non-polarizing beam splitter 4, and the fractional-order vortex light sequentially passes through the galvanometer 7, the scanning lens 8, the tube lens 9, and the objective lens 10, and then irradiates the to-be-measured sample 11 on the sample platform. The galvanometer 7 is a device used for laser scanning, capable of swinging at high speed to achieve rapid scanning and positioning of laser beams. The scanning lens 8 is configured to focus the laser beam into a uniformly sized spot on a plane. The tube lens 9 is an optical element commonly used in microscopes for imaging. The objective lens 10 may be a lens group composed of several lenses and is the most crucial optical component of a microscope, primarily used for imaging the object to be detected for the first time by using light.

In this embodiment, after the fractional-order vortex light irradiates the surface of the to-be-measured sample 11, the reflected light signal is reflected, and the reflected light signal sequentially passes through the objective lens 10, the tube lens 9, the scanning lens 8, the galvanometer 7, and the second non-polarizing beam splitter 6. First, the objective lens 10 receives the reflected light signal reflected by the to-be-measured sample 11, and sequentially transmits the reflected light signal to the tube lens 9, the scanning lens 8, and the galvanometer 7 before reaching the second non-polarizing beam splitter 6. The second non-polarizing beam splitter 6 then transmits the reflected light signal to the signal collection and demodulation module.

In this embodiment, the signal collection and demodulation module includes a diaphragm 13, a focusing lens 14, a pinhole 15, a photomultiplier 16, and a lock-in amplifier 17 sequentially arranged in the light propagation direction. The focusing lens 14 is arranged opposite to the second non-polarizing beam splitter 6, and the diaphragm 13 is arranged between the focusing lens 14 and the second non-polarizing beam splitter 6. The lock-in amplifier 17 is connected with the function generator 18, and the function generator 18 provides the reference signal for the lock-in amplifier 17. The diaphragm 13 is an entity that confines the light beam in the optical system. It may be an edge of the lens, a frame or a specially provided screen with a hole. The diaphragm may be used to limit the light beam or limit the field of view (that is, imaging range). The focusing lens 14 is a gradient index lens characterized by end-face focusing and imaging, and has a cylindrical shape. The pinhole 15 is a circular aperture with a diameter of tens of microns, used to form a small point light source and filter laser beams in the optical path. The photomultiplier 16 is a vacuum electronic device that converts weak optical signals into electric signals. The photomultiplier 16 is commonly employed in optical measurement and spectral analysis instruments, capable of detecting extremely weak radiation power with wavelengths ranging from 200 nm to 1,200 nm in low level photometry and spectroscopy. The lock-in amplifier 17 is an amplifier capable of extracting signals of a specific carrier frequency from environments with significant interference.

In this embodiment, the diaphragm 13 receives the reflected light signal transmitted by the second non-polarizing beam splitter 6, filters the reflected light signal, and retains a central scattered light signal. The central scattered light signal is focused to the pinhole 15 by the focusing lens 14, the photomultiplier 16 converts the central scattered light signal into an electric signal, and transmits the electric signal to the lock-in amplifier 17. The lock-in amplifier 17 demodulates the electric signal based on the reference signal, to obtain the measurement information of the to-be-measured sample 11.

In this embodiment, the lock-in amplifier 17 amplifies and demodulates the measurement electric signal based on the input reference signal at the same frequency as the phase switching frequency of the SLM 5, so as to obtain the nano-scale weak information of the to-be-measured sample 11.

It should be noted that in this embodiment, optical elements in the time-varying modulated illumination module, the optical scanning module, and the signal collection and demodulation module, as well as the function generator 18 are common optical elements in the field, and the functions of each optical element are common knowledge in the field. Details are not repeated herein.

In this embodiment, the sample platform may be an automatic displacement platform or a manual displacement platform. The automatic displacement platform is preferred in this embodiment, particularly a Z-axis translation stage 12. The Z-axis translation stage 12 may perform automatic axial displacement. Because the to-be-measured sample 11 is placed on the Z-axis translation stage 12, the automatic axial displacement of the Z-axis translation stage 12 enables the apparatus to realize scanning measurement on the to-be-measured sample 11, so as to obtain more comprehensive sample information of the to-be-measured sample 11.

Based on the structure of the dark-field confocal microscopy measurement apparatus provided in this embodiment, the working process mainly includes the following steps.

(a) The time-varying fractional-order vortex light is modulated by the SLM 5. First, two different fractional-order vortex phase images are loaded to the SLM 5, with the phase distributions respectively being the superposition of $\exp(il_1\varphi)$ and $\exp(il_2\varphi)$ with same blazed grating. $\varphi$ is the angular coordinate of the liquid crystal plane of the SLM 5, $l_1$ and $l_2$ are the orders, satisfying $1-l_1=l_2-1$, $|l_1|>0.5$, and $|l_2|>0.5$. The period of the blazed grating is M, the phase images are grayscale images, and the grayscale value 0-255 linearly corresponds to $0-2\pi$. The function generator 18 provides the reference signal, to trigger the SLM 5 to switch quickly between the two fractional-order vortex phase images, such that the ordinary incident light emitted by the laser 1 is modulated into time-varying fractional-order vortex light.

In this embodiment, the time-varying fractional-order vortex light refers to fractional-order vortex light with rapid order switching. Fractional-order vortex light features a spiral phase structure, zero central light intensity, a distinctive radial notch in the spot, and specific orbital angular momentum. These characteristics render fractional-order vortex light highly promising for applications in various fields such as optical measurement.

In this embodiment, the two fractional-order vortex phase images in the SLM 5 are switched in a trigger mode. The function generator 18 outputs two identical periodic signals as the reference signals. One signal is input to the SLM 5 to trigger the image modulation process of the SLM 5, with a frequency exceeding 1 kHz. The other reference signal is input to the lock-in amplifier 17, enabling the lock-in amplifier 17 to perform demodulation at the same frequency as the phase switching, and the time constant is larger than 2 to 3 times the period of the reference signal.

(b) The fractional-order vortex light sequentially passes through the galvanometer 7, the scanning lens 8, the tube lens 9, and the objective lens 10 and is focused on the surface of the to-be-measured sample 11.

In this embodiment, the incident light emitted by the laser 1 is parallel light, and the polarization state is adjusted to suit the SLM 5 through the half-wave plate 2 and the polarizer 3. After the parallel light enters the SLM 5 at an angle, the SLM 5 modulates the parallel light into fractional-order vortex light with rapid order switching. The period M of the blazed grating is adjusted until the first-order diffracted light emitted from the blazed grating is coaxial with the subsequent optical path.

(c) The reflected light signal is filtered by the diaphragm 13 to remove the approximately annular fractional-order vortex reflection light, and retain the central scattered light, and the dark-field confocal detection is performed through the focusing lens 14, the pinhole 15, and the photomultiplier 16.

(d) The measurement electric signal is input into the lock-in amplifier 17, and the lock-in amplifier 17 demodulates the measurement electric signal based on the reference signal provided by the function generator 18, to obtain the measurement information of the to-be-measured sample 11.

In this embodiment, when there is no defect at a scanning point, the reflected light signals under illumination of the $l_1$ and $l_2$—order vortex light have a fixed intensity difference, and the demodulation amplitude of the lock-in amplifier 17 is a non-zero baseline. When there is a defect at a scanning point, the intensity difference between the reflected light signals under illumination of the $l_1$ and $l_2$—order vortex light increases, and the demodulation amplitude and phase of the lock-in amplifier 17 change significantly, thus obtaining the defect distribution of the to-be-measured sample 11. Therefore, in this embodiment, when the measurement electric signal is demodulated by the lock-in amplifier 17, whether there are defects at each scanning point can be determined according to the demodulation amplitude and phase of the lock-in amplifier 17. Specifically, when the demodulation amplitude of the lock-in amplifier 17 is a non-zero baseline, it is determined that there is no defect at the current scanning point. When the demodulation amplitude and phase of the lock-in amplifier 17 obviously change, it is determined that there is a defect at the current scanning point.

Finally, the defect distribution of the to-be-measured sample 11 can be obtained.

(e) The sample platform may be a Z-axis translation stage 12. The light beam is used by the galvanometer 7 for optically scanning. At each scanning point, an amplitude voltage is obtained for demodulation by the lock-in amplifier 17. The light beam scans across the to-be-measured sample 11 to generate a 2D image.

In this embodiment, the fractional-order vortex light is used for a pointwise scanning process on the surface of the to-be-measured sample 11, and the residence time at each scanning point is longer than 2 to 3 times the phase switching period.

(f) The Z-axis translation stage 12 moves in a step-by-step manner, and a 2D image is recorded every step. After the measurement, 3D imaging of the to-be-measured sample 11 can be realized.

In order to make the specific measurement process of the apparatus in this application clearer, the following example is used for description. In practical use, two different fractional-order vortex phase images need to be pre-loaded to the SLM 5. One image features a vortex phase order of 0.8, while the other has a vortex phase order of 1.2. Then, the function generator 18 is controlled with program setting to generate 1.5 kHz trigger signals, to enable the SLM 5 to switch between two fractional-order vortex phase images at a speed of 1.5 kHz. The SLM 5 is positioned in the illumination path of the time-varying modulated illumination module, and the polarization state of the incident light of the laser 1 is modulated by the half-wave plate 2 and polarizer 3 to match with the SLM 5. The incident light irradiates the SLM 5 to obtain the fractional-order vortex light with rapidly switching phases (between 0.8 and 1.2 orders). The fractional-order vortex light is then directed by the optical scanning module onto the surface of the to-be-measured sample 11, enabling the fractional-order vortex light to sequentially pass through the second non-polarizing beam splitter 6, the galvanometer 7, the scanning lens 8, the tube lens 9, and the objective lens 10, and irradiate the surface of to-be-measured sample 11. The galvanometer 7 scans the to-be-measured sample 11, with the intensity of the reflected light signal recorded at each scanned point. The residence time at a single scanning point is set to 2 ms. The reflected light signal passes back through the objective lens 10, the tube lens 9, the scanning lens 8, the galvanometer 7, and the second non-polarizing beam splitter 6 before reaching the signal collection and demodulation module. The diaphragm 13 of the signal collection and demodulation module receives and filters the reflected light signal transmitted by the second non-polarizing beam splitter 6, to retain the central scattered light signal, which is then focused by the focusing lens 14 to the pinhole 15. The photomultiplier 16 collects the reflected light signal and converts into a measurement electric signal. Finally, the measurement electric signal is input to the lock-in amplifier 17. The function generator 18 provides a 1.5 kHz reference signal for the lock-in amplifier 17. The lock-in amplifier 17 demodulates the measurement electric signal based on the reference signal. When the demodulation amplitude of the lock-in amplifier 17 is a non-zero baseline, it is determined that there is no defect at the current scanning point. When the demodulation amplitude and phase of the lock-in amplifier 17 obviously change, it is determined that there is a defect at the current scanning point. This process determines the presence of defects at each position point on the to-be-measured sample 11. Finally, the defect distribution of the to-be-measured sample 11 is obtained.

In this embodiment, on one hand, time-varying fractional-order vortex light illumination is employed to enhance the scattering information of the to-be-measured sample 11, thereby increasing the signal intensity of micro-defects and improving the sensitivity of the apparatus for defect detection. On the other hand, the lock-in amplifier 17 leverages high-sensitivity demodulation of signals exhibiting small periodic changes to detect weak intensity and phase fluctuations caused by defects, thereby enhancing the sensitivity of the apparatus for defect detection.

Figure 2:
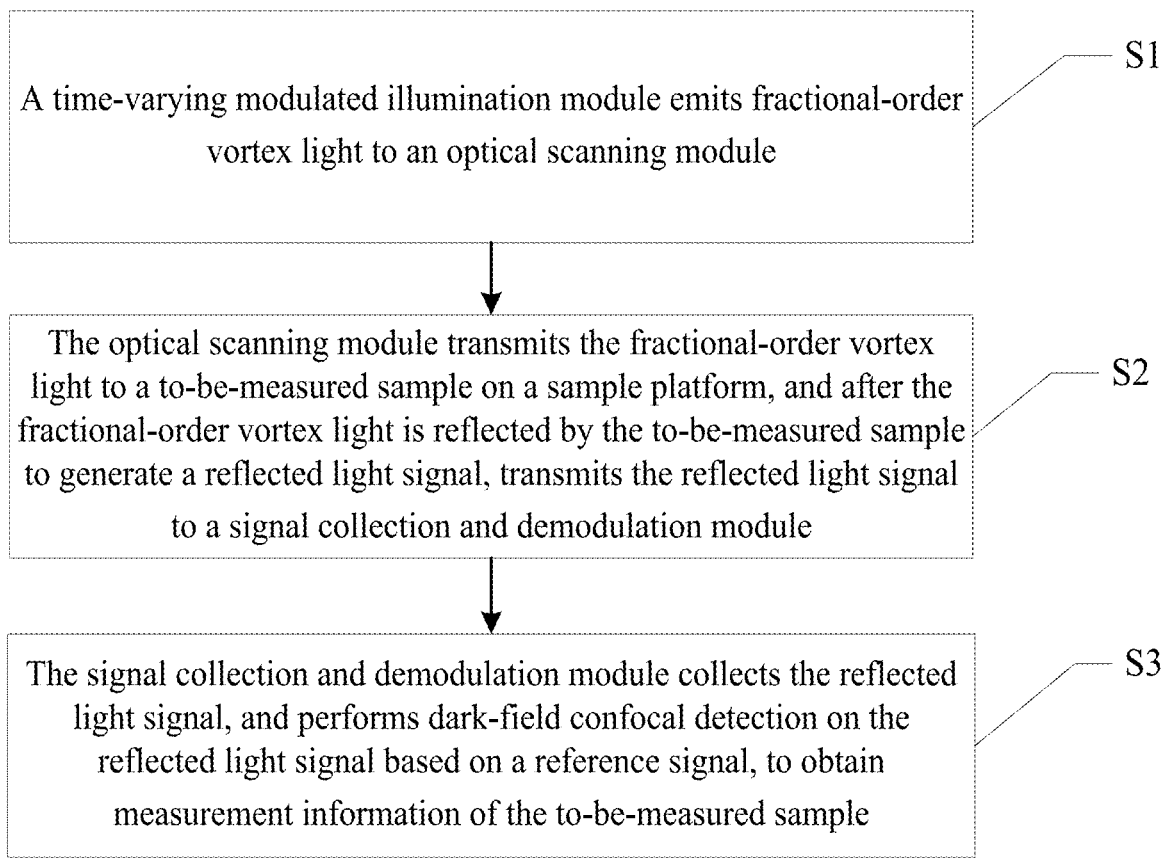
FIG. 2 is a schematic flowchart of a dark-field confocal microscopy measurement method based on time-varying fractional-order vortex demodulation according to an embodiment of this application.
Figure 3:
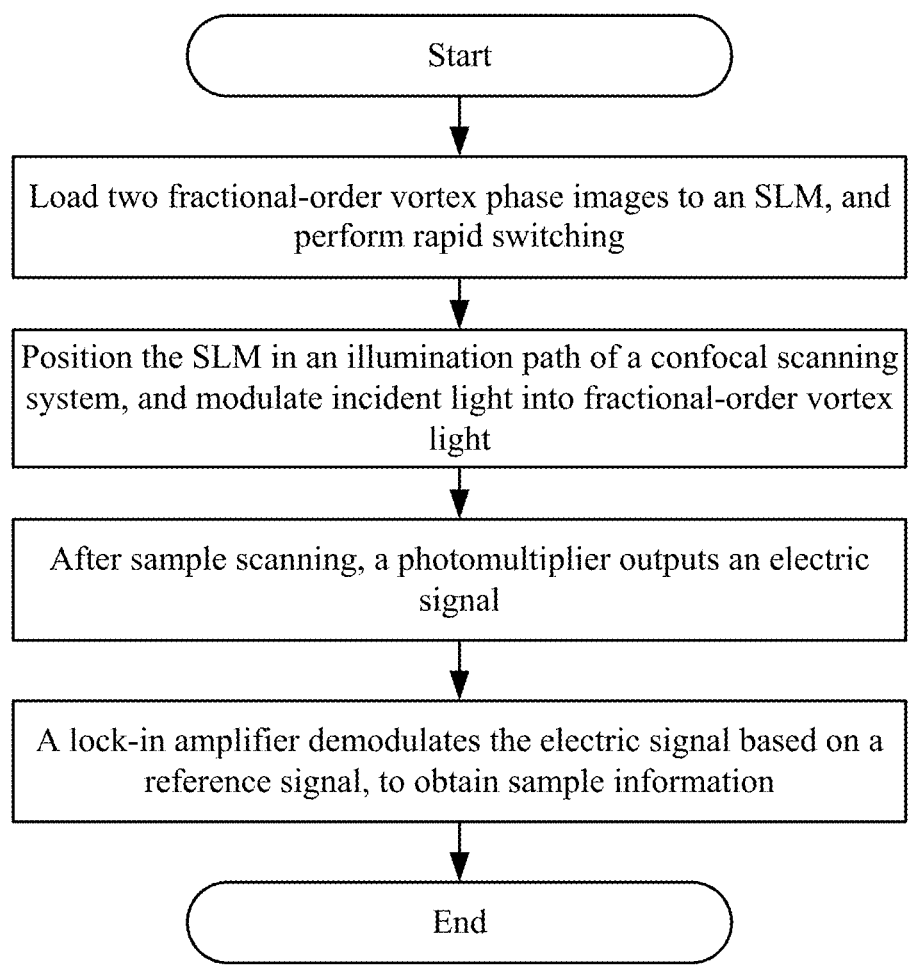
FIG. 3 is a principle diagram of a dark-field confocal microscopy measurement method based on time-varying fractional-order vortex demodulation according to an embodiment of this application.

Another embodiment of this application provides a dark-field confocal microscopy measurement method based on time-varying fractional-order vortex demodulation, applied to the dark-field confocal microscopy measurement apparatus based on time-varying fractional-order vortex demodulation as described in the previous embodiment. As shown in FIG. 2 and FIG. 3, the dark-field confocal microscopy measurement method based on time-varying fractional-order vortex demodulation mainly includes the following steps.

Step S1: A time-varying modulated illumination module emits fractional-order vortex light to an optical scanning module.

Step S2: The optical scanning module transmits the fractional-order vortex light to a to-be-measured sample 11 on a sample platform, and after the fractional-order vortex light is reflected by the to-be-measured sample 11 to generate a reflected light signal, transmits the reflected light signal to a signal collection and demodulation module.

Step S3: The signal collection and demodulation module collects the reflected light signal, and performs dark-field confocal detection on the reflected light signal based on a reference signal, to obtain measurement information of the to-be-measured sample 11. The measurement information is a measurement result obtained through dark-field confocal detection and indicating whether the to-be-measured sample 11 has defects or not.

In this embodiment, said a time-varying modulated illumination module emits fractional-order vortex light to an optical scanning module in step S1 specifically includes the following steps:

Step S11: A laser 1 emits incident light, where the incident light sequentially passes through a half-wave plate 2, a polarizer 3, and a first non-polarizing beam splitter 4 and then reaches an SLM 5.

Step S12: The SLM 5 modulates the incident light into the fractional-order vortex light based on a reference signal and transmits the fractional-order vortex light to the first non-polarizing beam splitter 4.

Step S13: The first non-polarizing beam splitter 4 transmits the fractional-order vortex light to the optical scanning module.

In this embodiment, said the optical scanning module transmits the fractional-order vortex light to a to-be-measured sample 11 on a sample platform, and after the fractional-order vortex light is reflected by the to-be-measured sample 11 to generate a reflected light signal, transmits the reflected light signal to a signal collection and demodulation module in step S2 specifically includes the following steps:

Step S21: A second non-polarizing beam splitter 6 receives the fractional-order vortex light emitted from the first non-polarizing beam splitter 4, and sequentially transmits the fractional-order vortex light to a galvanometer 7, a scanning lens 8, a tube lens 9, and an objective lens 10, to irradiate the to-be-measured sample 11 on the sample platform.

Step S22: The objective lens 10 receives the reflected light signal reflected by the to-be-measured sample 11, and sequentially transmits the reflected light signal to the tube lens 9, the scanning lens 8, and the galvanometer 7 before reaching a second non-polarizing beam splitter 6.

Step S23: The second non-polarizing beam splitter 6 transmits the reflected light signal to the signal collection and demodulation module.

In this embodiment, said the signal collection and demodulation module collects the reflected light signal, and performs dark-field confocal detection on the reflected light signal based on a reference signal, to obtain measurement information of the to-be-measured sample 11 in step S3 specifically includes the following steps:

Step S31: A diaphragm 13 receives the reflected light signal transmitted by the second non-polarizing beam splitter 6, and filters the reflected light signal to obtain a central scattered light signal.

Step S32: A focusing lens 14 focuses the central scattered light signal to a pinhole 15, to transmit the central scattered light signal to a photomultiplier 16 through the pinhole 15.

Step S33: The photomultiplier 16 converts the central scattered light signal into an electric signal, and transmits the electric signal to a lock-in amplifier 17.

Step S34: The lock-in amplifier 17 demodulates the electric signal based on the reference signal, to obtain the measurement information of the to-be-measured sample 11.

This application provides a dark-field confocal microscopy measurement apparatus and method based on time-varying fractional-order vortex demodulation. The fractional-order vortex light with rapid order switching serves as incident light for scanning the to-be-measured sample 11. Surface reflection information and interlayer defect scattering information are distinguished using orbital angular momentum. Defect signals are accentuated by asymmetric changes in scattering information during rapid phase switching.

High-sensitivity sample information is obtained through demodulation with the lock-in amplifier 17. This enables the capture of nano-scale measurement information of the to-be-measured sample 11, enhancing the accuracy and reliability of defect identification. The dark-field confocal microscopy measurement apparatus thus improves defect detection accuracy and identification rates.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

Several examples are used herein for illustration of the principles and implementations of this application. The description of the foregoing examples is used to help illustrate the method of this application and the core principles thereof. In addition, those of ordinary skill in the art can make various modifications in terms of specific implementations and scope of application in accordance with the teachings of this application. In conclusion, the content of the present specification shall not be construed as a limitation to this application.

What is claimed is:

1. A dark-field confocal microscopy measurement apparatus based on time-varying fractional-order vortex demodulation, comprising a time-varying modulated illumination module, an optical scanning module, a signal collection and demodulation module, a function generator, and a sample platform, wherein the function generator is separately connected with the time-varying modulated illumination module and the signal collection and demodulation module;

the function generator is configured to provide reference signals for the time-varying modulated illumination module and the signal collection and demodulation module separately;

the sample platform is configured to hold a to-be-measured sample;

the time-varying modulated illumination module is configured to emit fractional-order vortex light to the optical scanning module;

the optical scanning module is configured to: transmit the fractional-order vortex light to the to-be-measured sample on the sample platform, and after the fractional-order vortex light is reflected by the to-be-measured sample to generate a reflected light signal, transmit the reflected light signal to the signal collection and demodulation module; and the signal collection and demodulation module is configured to: collect the reflected light signal, and perform dark-field confocal detection on the reflected light signal based on the reference signal, to obtain measurement information of the to-be-measured sample, wherein the measurement information is a measurement result obtained through dark-field confocal detection and indicating whether the to-be-measured sample has defects or not.

2. The dark-field confocal microscopy measurement apparatus based on time-varying fractional-order vortex demodulation according to claim 1, wherein the time-varying modulated illumination module comprises a laser, a half-wave plate, a polarizer, a first non-polarizing beam splitter, and a spatial light modulator (SLM) that are sequentially arranged, and the SLM is connected with the function generator; and the laser emits incident light, the incident light sequentially passes through the half-wave plate, the polarizer, and the first non-polarizing beam splitter and then reaches the SLM, the SLM modulates the incident light into the fractional-order vortex light based on the reference signal and transmits the fractional-order vortex light to the first non-polarizing beam splitter, and the first non-polarizing beam splitter transmits the fractional-order vortex light to the optical scanning module.

3. The dark-field confocal microscopy measurement apparatus based on time-varying fractional-order vortex demodulation according to claim 2, wherein the optical scanning module comprises a second non-polarizing beam splitter, a galvanometer, a scanning lens, a tube lens, and an objective lens that are arranged in sequence;

the second non-polarizing beam splitter is arranged opposite to the first non-polarizing beam splitter, and the objective lens is arranged opposite to the sample platform;

the second non-polarizing beam splitter receives the fractional-order vortex light emitted from the first non-polarizing beam splitter, and the fractional-order vortex light sequentially passes through the galvanometer, the scanning lens, the tube lens, and the objective lens, and then irradiates the to-be-measured sample on the sample platform; and the objective lens receives the reflected light signal reflected by the to-be-measured sample, and sequentially transmits the reflected light signal to the tube lens, the scanning lens, and the galvanometer before reaching the second non-polarizing beam splitter, and the second non-polarizing beam splitter transmits the reflected light signal to the signal collection and demodulation module.

4. The dark-field confocal microscopy measurement apparatus based on time-varying fractional-order vortex demodulation according to claim 3, wherein the signal collection and demodulation module comprises a diaphragm, a focusing lens, a pinhole, a photomultiplier, and a lock-in amplifier that are arranged in sequence;

the focusing lens is arranged opposite to the second non-polarizing beam splitter, and the diaphragm is arranged between the focusing lens and the second non-polarizing beam splitter; the lock-in amplifier is connected with the function generator; and the diaphragm receives the reflected light signal transmitted by the second non-polarizing beam splitter, filters the reflected light signal, and retains a central scattered light signal, the central scattered light signal is focused to the pinhole by the focusing lens, the photomultiplier converts the central scattered light signal into an electric signal, and transmits the electric signal to the lock-in amplifier, and the lock-in amplifier demodulates the electric signal based on the reference signal, to obtain the measurement information of the to-be-measured sample.

5. The dark-field confocal microscopy measurement apparatus based on time-varying fractional-order vortex demodulation according to claim 1, wherein the sample platform is a Z-axis translation stage.

6. A dark-field confocal microscopy measurement method based on time-varying fractional-order vortex demodulation, applied to the dark-field confocal microscopy measurement apparatus based on time-varying fractional-order vortex demodulation according to claim 1, and comprising:

emitting, by a time-varying modulated illumination module, fractional-order vortex light to an optical scanning module;

transmitting, by the optical scanning module, the fractional-order vortex light to a to-be-measured sample on a sample platform, and after the fractional-order vortex light is reflected by the to-be-measured sample to generate a reflected light signal, transmitting the reflected light signal to a signal collection and demodulation module; and collecting, by the signal collection and demodulation module, the reflected light signal, and performing dark-field confocal detection on the reflected light signal based on a reference signal, to obtain measurement information of the to-be-measured sample, wherein the measurement information is a measurement result obtained through dark-field confocal detection and indicating whether the to-be-measured sample has defects or not.

7. The dark-field confocal microscopy measurement method based on time-varying fractional-order vortex demodulation according to claim 6, wherein the time-varying modulated illumination module comprises a laser, a half-wave plate, a polarizer, a first non-polarizing beam splitter, and a spatial light modulator (SLM) that are sequentially arranged; and said emitting, by a time-varying modulated illumination module, fractional-order vortex light to an optical scanning module specifically comprises:

emitting, by the laser, incident light, wherein the incident light sequentially passes through the half-wave plate, the polarizer, and the first non-polarizing beam splitter and then reaches the spatial light modulator (SLM);

modulating, by the SLM, the incident light into the fractional-order vortex light based on a reference signal, and transmitting the fractional-order vortex light to the first non-polarizing beam splitter; and transmitting, by the first non-polarizing beam splitter, the fractional-order vortex light to the optical scanning module.

8. The dark-field confocal microscopy measurement method based on time-varying fractional-order vortex demodulation according to claim 7, wherein the optical scanning module comprises a second non-polarizing beam splitter, a galvanometer, a scanning lens, a tube lens, and an objective lens that are arranged in sequence; and said transmitting, by the optical scanning module, the fractional-order vortex light to a to-be-measured sample on a sample platform, and after the fractional-order vortex light is reflected by the to-be-measured sample to generate a reflected light signal, transmitting the reflected light signal to a signal collection and demodulation module specifically comprises:

receiving, by the second non-polarizing beam splitter, the fractional-order vortex light emitted from the first non-polarizing beam splitter, and sequentially transmitting the fractional-order vortex light to the galvanometer, the scanning lens, the tube lens, and the objective lens, to irradiate the to-be-measured sample on the sample platform;

receiving, by the objective lens, the reflected light signal reflected by the to-be-measured sample, and sequentially transmitting the reflected light signal to the tube lens, the scanning lens, and the galvanometer before reaching the second non-polarizing beam splitter; and transmitting, by the second non-polarizing beam splitter, the reflected light signal to the signal collection and demodulation module.

9. The dark-field confocal microscopy measurement method based on time-varying fractional-order vortex demodulation according to claim 8, wherein the signal collection and demodulation module comprises a diaphragm, a focusing lens, a pinhole, a photomultiplier, and a lock-in amplifier that are arranged in sequence; and said collecting, by the signal collection and demodulation module, the reflected light signal, and performing dark-field confocal detection on the reflected light signal based on a reference signal, to obtain measurement information of the to-be-measured sample specifically comprises:

receiving, by the diaphragm, the reflected light signal transmitted by the second non-polarizing beam splitter, and filtering the reflected light signal to obtain a central scattered light signal;

focusing, by the focusing lens, the central scattered light signal to the pinhole, to transmit the central scattered light signal to the photomultiplier through the pinhole;

converting, by the photomultiplier, the central scattered light signal into an electric signal, and transmitting the electric signal to the lock-in amplifier; and demodulating, by the lock-in amplifier, the electric signal based on the reference signal, to obtain the measurement information of the to-be-measured sample.

10. The dark-field confocal microscopy measurement method based on time-varying fractional-order vortex demodulation according to claim 6, wherein the sample platform is a Z-axis translation stage.

* * * * *